Feb. 12, 1935.                H. FREIBERGER                1,991,274
                           NO-PASTE PHOTOGRAPH ALBUM
                              Filed Oct. 4, 1932
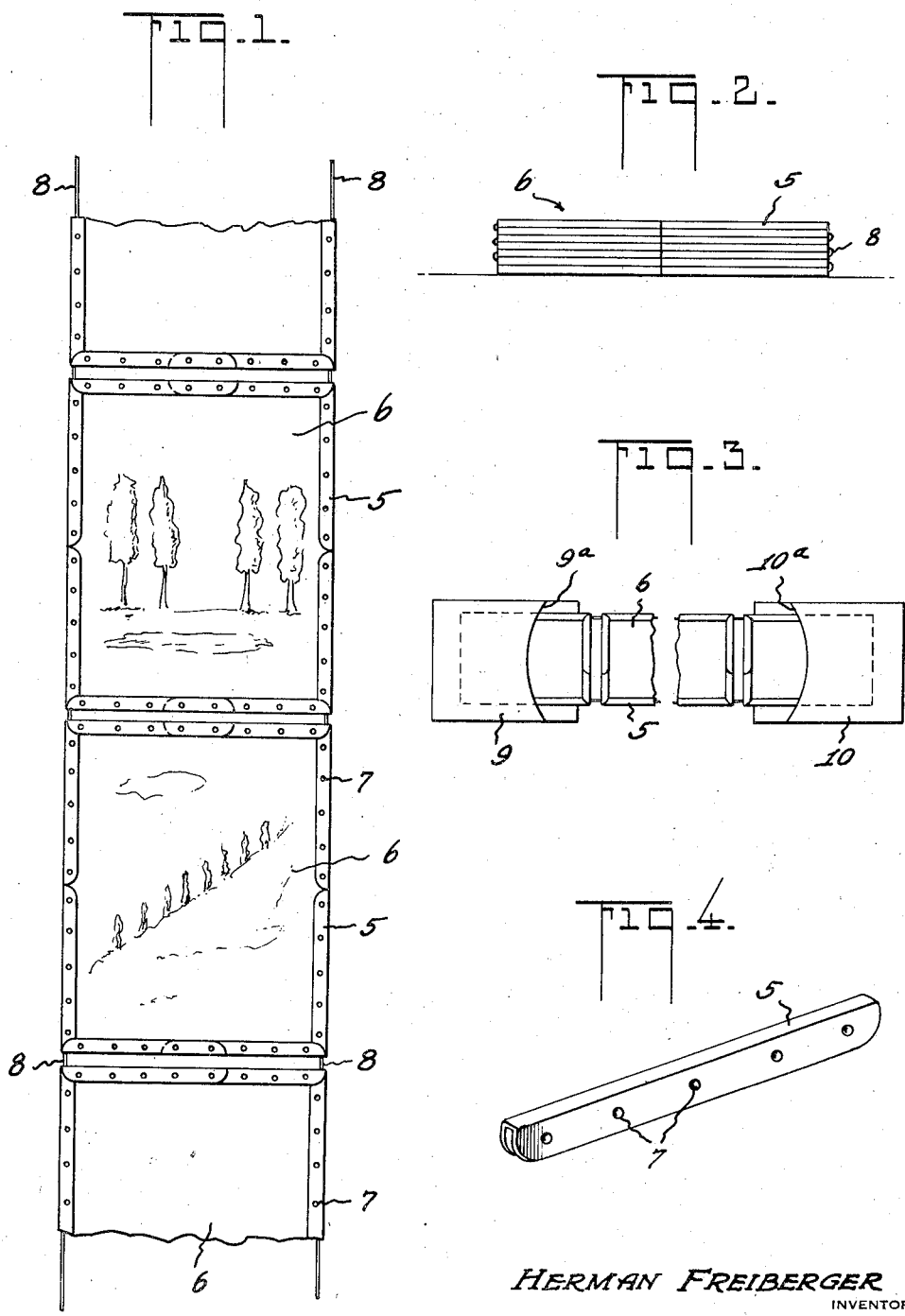
HERMAN FREIBERGER
INVENTOR
BY Victor J. Evans & Co.
ATTORNEY Patented Feb. 12, 1935

1,991,274

UNITED STATES PATENT OFFICE 1,991,274

NO-PASTE PHOTOGRAPH ALBUM

Herman Freiberger, Richmond Hill, N. Y.

Application October 4, 1932, Serial No. 636,225

4 Claims. (Cl. 40—102)

This invention relates to photograph albums.

The invention will be fully and comprehensively understood from a consideration of the following detailed description when read in connection with the accompanying drawing which forms part of the application, with the understanding, however, that the improvement is capable of extended application and is not confined to the exact showing of the drawing nor to the precise construction described and, therefore, such changes and modification may be made therein as do not affect the spirit of the invention nor exceed the scope thereof as expressed in the appended claims.

In the drawing:

Fig. 1 is a plan view of framed pictures made and connected together in accordance with my invention.

Fig. 2 is an elevational view of a plurality of connected pictures made in accordance with my invention and placed in superposed position.

Fig. 3 is a broken plan view of a series of pictures made in accordance with my invention and provided with front and back covers, the whole forming a picture album; and Fig. 4 is a perspective view of a frame element from a plurality of which picture frames are made in accordance with my invention.

Referring to the drawing for a more detailed description thereof, the numeral 5 indicates channel-shaped members, the construction of which is shown prospectively in Fig. 4. According to my invention, I form novel picture frames by means of said channel members, the same being provided with small projections on the inner faces of their side walls so that they are held in position by pressing their sides onto the opposite faces of the pictures 6, said projections being formed by making depressions 7 on the outer faces of said side walls. As shown in Fig. 1, said channel-shaped members are preferably placed either end to end or in overlapping relation, according to the relative dimensions of the pictures and the channel-shaped members. It will thus be realized that a standard length of channel-shaped member may be employed if desired to make frames for various sized pictures.

In order to hold together a series of pictures, framed as described, I provide two flexible connecting elements 8 in the form of strings, which run through the side channel-shaped members of the series and are held in position when said members are pressed onto the pictures. It will be noted from Fig. 1 that the pictures are slightly spaced apart, this for the purpose of enabling the pictures to be stacked or disposed in superposed position, as shown in Fig. 2.

In order to form an album with the stacked set of pictures, I provide front and back covers 9 and 10, respectively, as shown in Fig. 3. Said covers include pockets 9a and 10a, respectively, into which the end pictures of the series are inserted. If desired, the pictures may have backings and also transparent coverings, said backings and coverings, when used, being clamped between the sides of the channel-shaped members.

What is claimed is:

1. A plurality of framed pictures arranged to form an aligned series, and flexible means for holding the same together, the frames of said pictures being formed by channel-shaped members pressed onto the pictures.

2. A plurality of framed pictures arranged to form an aligned series, and flexible means for holding the same together, the frames of said pictures being formed by channel-shaped members pressed onto the pictures, said flexible means running thru certain of said members.

3. A plurality of framed pictures arranged to form an aligned series, and flexible means for holding the same together, said pictures being spaced slightly apart to permit their being placed in superposed position, and pockets forming front and back covers for said pictures when superposed and into which the end pictures may be inserted.

4. The combination of a sheet with a frame comprising a plurality of channel-shaped members pressed onto said sheet, said members being of the same length and at least some of the same overlapping adjacent members.

HERMAN FREIBERGER.